Nov. 9, 1965  D. W. LINDHOLM  3,216,482
ADJUSTABLE GATE
Filed Oct. 11, 1963  2 Sheets-Sheet 1
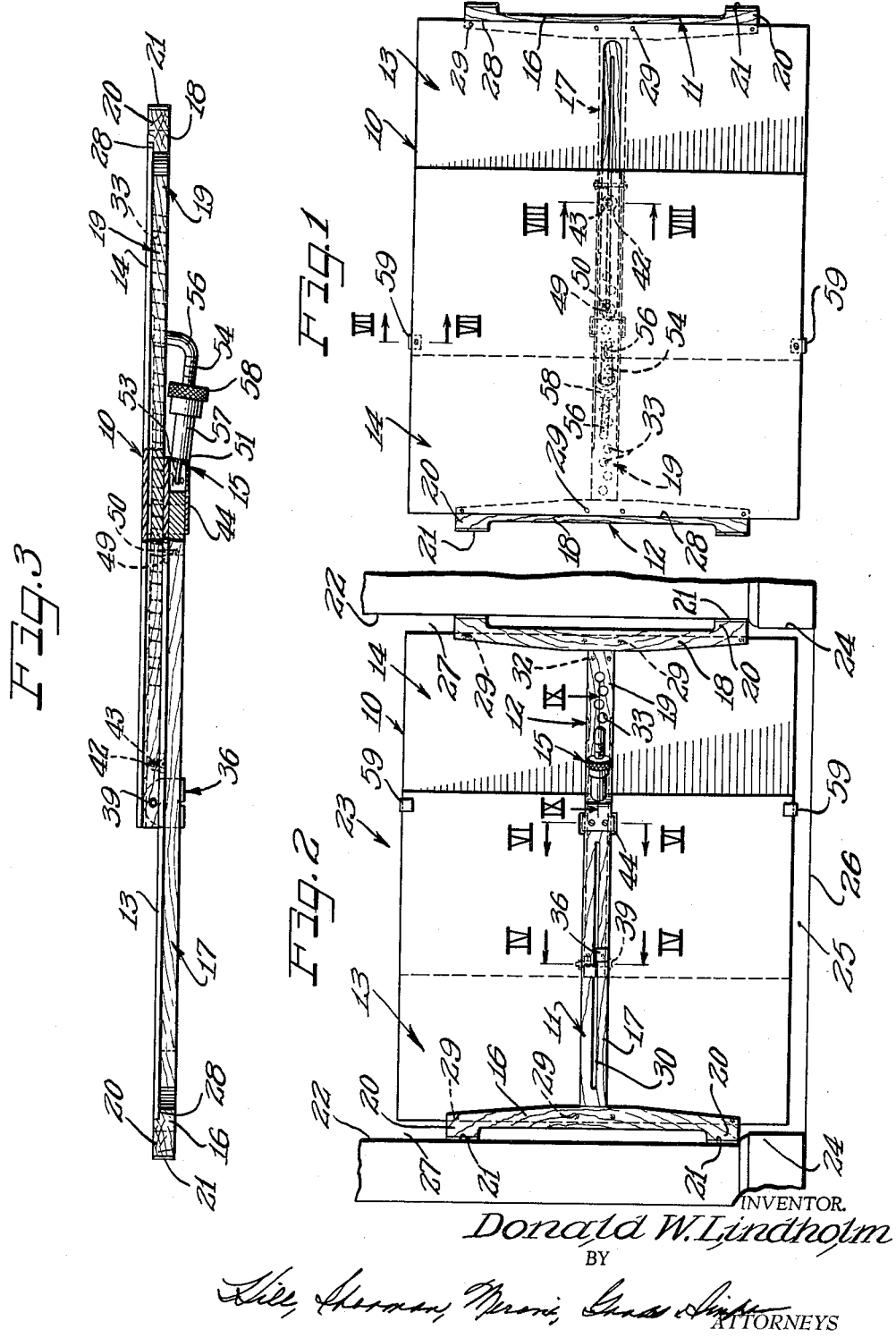
INVENTOR.
Donald W. Lindholm
BY
ATTORNEYS Nov. 9, 1965 D. W. LINDHOLM 3,216,482
ADJUSTABLE GATE
Filed Oct. 11, 1963 2 Sheets-Sheet 2

INVENTOR.
Donald W. Lindholm
BY
ATTORNEYS

United States Patent Office 3,216,482
Patented Nov. 9, 1965

3,216,482
ADJUSTABLE GATE
Donald W. Lindholm, 15929 S. Grove St., Oak Forest, Ill.
Filed Oct. 11, 1963, Ser. No. 315,533
3 Claims. (Cl. 160—216)

This invention relates to a portable adjustable gate or barrier which is easily installed in doorways and the like openings without marring woodwork or walls to block off stairways, rooms, and the like, without exposing any mechanism which could pinch or otherwise injure a child or pet. Specifically the invention deals with a gate having two telescoping panels adapted to be wedge fitted in a doorway by means of a single actuator that is easily operated but is out of reach of the child or pet to be confined.

Adjustable gates of the expansible lazy tongs type are quite unsatisfactory for confining small pets and children because they provide open areas through which the confined child or pet may attempt to pass, provide ladder-like cross pieces inviting climbing, and are quite filmsy especially when opened up to their full width. Attempts to provide solid panel adjustable gates for wedging in doorways have not been satisfactory because the constructions are expensive and unwieldy.

The present invention now provides a lightweight inexpensive easily operated solid panel type adjustable gate for wedge fitting in a doorway. The gate of this invention is composed of slidably connected T-shaped members the heads of which engage the door frame and the stems of which overlap each other in connected but slidable relation. Each of these T-shaped members carries a lightweight solid panel. When the T-shaped members are extended to their fully opened condition the panels will be in substantially end-to-end relation with only a small portion thereof overlapped. Conversely, when the T-shaped members are moved together to overlap the stems and to bring the heads to their closest adjoining position, the panels carried thereby will be substantially completely overlapped. The gate therefore has a wide range of operating widths from a single panel width to substantially a double panel width. The gate can be wedge fitted in a doorway in any condition between the fully collapsed width and the fully extended width by means of a simplified adjusting mechanism composed of an adjusting finger or lock carried by the stem of one T-shaped member and a plurality of socket holes provided in the stem of the other T-shaped member. When the gate is extended to contact the heads of the T-shaped members against the door frame or side walls of the space to be blocked by the gate, the finger is inserted in the closest adjoining hole or socket and a turn screw is manipulated for extending the locking device to wedge the heads of the T members against the door frames or walls. For removing the gate it is only necessary to loosen the locking device, withdraw the finger from the socket hole and telescope the extended T members and the panels carried thereby.

A feature of the invention resides in the provision of simplified T members with stems in slidably connected overlapped relation and with heads adapted to abut a door frame for supporting solid panel members in adjusted position in the doorway or the like opening.

Another feature of the invention is the provision of a simplified lock and extending mechanism for an adjustable gate.

The T members of the gates of this invention can be composed of wood, plastic, metal, or similar rigid material. The panels carried by the T members can be composed of lightweight sheet material such as plywood, pressboard, plastic, and the like. Since the panels can be composed of any relatively rigid sheet material they can be transparent, decorated as desired, covered with wallpaper to match the decor of a room, etc.

It is then an important object of this invention to provide an inexpensive lightweight easily manipulated wedge type adjustable gate for doorways and the like.

A further object of the invention is to provide a solid panel adjustable gate adapted to be easily secured in a doorway without marring the door frame and without permitting access to any of its mechanism from the side thereof that is exposed to the animal or child confined by the gate.

An important object of this invention is to provide an inexpensive adjustable solid panel type gate with a frame assembly that can be easily collapsed or extended and locked in any desired position between a fully collapsed condition and a fully expanded condition thereby accommodating installation of the gate in a wide range of door opening widths.

A specific object of the invention is to provide an adjustable gate adapted to be wedged in a door opening or the like which has inexpensive T-shaped frame members, the stems of which are slidably connected in overlapped relation and the heads of which form the abutment members for engaging the door frame.

Another object of the invention is to provide an adjustable gate with slidably connected T-shaped frame members carrying an adjustable locking mechanism that will wedge lock the T heads against door frames and the like.

Other and further objects of this invention will be apparent to those skilled in this art from the following detailed description of the annexed sheets of drawings which, by way of a preferred example only, illustrate one embodiment of the invention.

On the drawings:

FIGURE 1 is an elevational view of the adjustable gate of this invention showing the side that is exposed to the animal or child confined by the gate.

FIGURE 2 is an elevational view of the opposite side of the gate of FIG. 1 and showing the manner in which the same is wedge fitted in a door opening.

FIGURE 3 is a top plan view of the gate of FIGS. 1 and 2 with parts broken away and shown in horizontal cross section.

As shown on the drawings:

Figure 5:
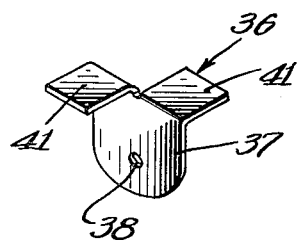
FIGURE 5 is a perspective view of the clamp fitting in the assembly of FIG. 4.

The adjustable gate 10 of FIGS. 1 to 3 includes a first T-shaped wooden frame 11, a second T-shaped wooden frame 12, a first panel 13 carried by the first frame 11, a second panel 14 carried by the second frame 12 and wedge locking mechanism 15 carried by the frame 11 and coacting with the frame 12.

The T-shaped frame 11 has a head 16 at the outer edge of the panel 13 and a stem 17 extending across the central portion of the panel 13. The frame 12 has a head 18 at the outer edge of the panel 14 and a stem 19 extending transversely across the central portion of the panel 14. The heads 16 and 18 of the frames have laterally projecting feet portions 20 preferably covered with non-skid rubber or felt pads 21 for engaging the side walls 22 of a door opening 23 closed by the gate 10. These side walls 22 may have baseboards 24 projecting slightly into the opening 23 and it will be noted that when the bottom feet 20 are disposed immediately above the baseboards 24 the panels 13 and 14 depend sufficiently below the feet to overlap the baseboards 24 and provide only a very narrow opening 25 between the bottom of the gate and the floor 26 of the door opening 23. It will also be noted that the feet 20 only project beyond the lateral edges of the panels 13 and 14 a relatively short distance sufficient to space the outer edges of the panels just inwardly from the floor boards 24 and thereby provide only very narrow openings 27 between the edges of the panels and the sides 22 of the door opening 23.

The heads 16 and 18 of the frame members 11 and 12 have grooves 28 along the full lengths of their outer faces respectively receiving the outer edges of the panels 13 and 14 and fasteners such as bolts, screws or rivets 29 secure the panel edges in these grooves with the outer faces of the panels lying flush with the outer faces of the heads as best shown in FIG. 3.

The stem 17 of the frame 11 is secured to the central portion of the inner edge of the head 16 in fixed relation and is also affixed to the outer face of the panel 13 along the length thereof as by means of a glue bond, fasteners, or the like. The stem 17 has a longitudinal slot 30 along substantially the entire length thereof and as shown in FIG. 4 this slot 30 is aligned with a similar but somewhat wider slot 31 in the panel 13.

The stem 19 of the frame 12 is similarly affixed to the central portion of the head 18 and along its length to the panel 14, fasteners being shown at 32 connecting the stem 19 to the panel 14 (FIG. 2). The stem 19 has a plurality of socket holes 33 along its length preferably in staggered relation to cooperate with the locking device 15 as will be more fully hereinafter described. The end of the stem 19 has a relatively short and narrow slot 34 therethrough aligned with the slots 30 and 31 as shown in FIG. 4 and a vertical bore 35 through the stem 19 intersects this slot 34.

Figure 4:
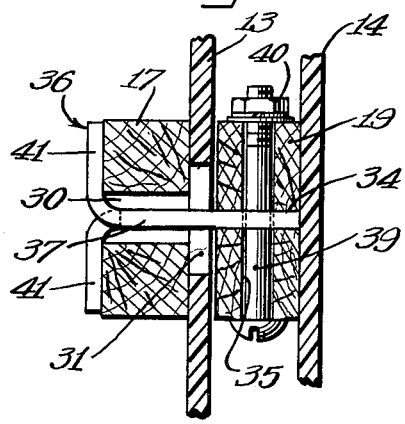
FIGURE 4 is an enlarged vertical cross sectional view along the lines IV—IV of FIG. 2.
Figure 8:
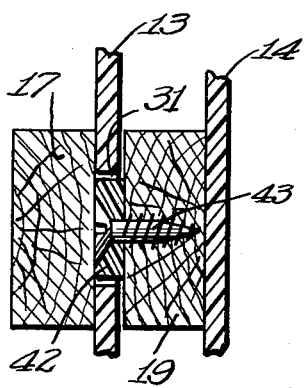
FIGURE 8 is an enlarged cross sectional view taken along the line VIII—VIII of FIG. 1.

A metal bracket 36 best shown in FIGS. 3 to 5 has a main tongue portion 37 extended through the slots 30 and 31 of the stem 17 and panel 13 respectively and into the slot 34 of the stem 19 as shown in FIG. 4. This tongue has an aperture 38 receiving a bolt 39 extended through the bore 35 of the stem 19 to hold the bracket 36 in fixed position relative to the stem 19. A nut 40 on the bolt secures the assembly together. The tongue 37 has oppositely bent end flanges 41 overlying the stem 17. This bracket 36 therefore holds the end of the stem 19 in slidably connected relation with the stem 17 and its panel 13. However to prevent rubbing contact between the stem 19 and the panel 13 a plastic button 42 on self-lubricating plastic material such as nylon, Teflon, or the like, is secured by a screw 43 to the face of the stem 19 and projects through the slot 31 of the panel 13 to form a sliding contact with the stem 17 as shown in FIGS. 3 and 8.

Figure 6:
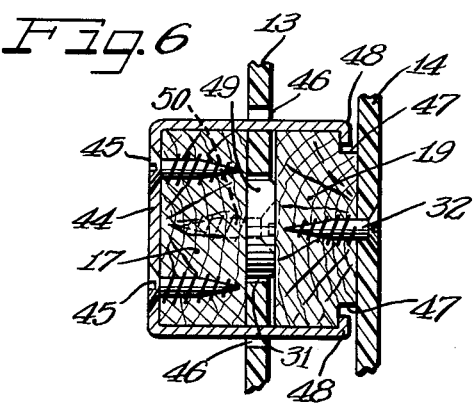
FIGURE 6 is an enlarged cross sectional view taken along the lines VI—VI of FIG. 2.

The free end of the stem 17 has a U-shaped bracket 44 secured thereon as by means of screws 45 as shown in FIG. 6 and the legs of the bracket extend through short slots 46 in the panel 13 on both sides of the slot 31 thereof. As shown in FIG. 6 the stem 19 has grooves 47 along the top and bottom edges thereof adjacent the panel 14 and end flanges 48 on the bracket 45 extend into these grooves. The free end of the stem 17 is thereby slidably connected with the stem 19 and in order to prevent the stem 19 from rubbing against the panel 13 at this point a second plastic button 49 (FIG. 6) is carried by the stem 17 on a fastener 50 and projects through the slot 31 of the panel 13 to ride on the adjacent face of the stem 19.

Since the button 42 is affixed to the stem 19 while the button 49 is affixed to the stem 17, the two buttons besides serving as antifriction slide connections between the stems and panel 13 will also act as abutment heads limiting the extension of the stems.

Figure 9:
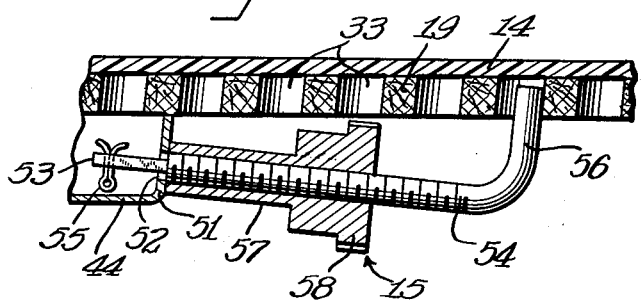
FIGURE 9 is an enlarged cross sectional view taken along the line IX—IX of FIG. 2.

As best shown in FIGS. 3 and 9 the bracket 44 extends beyond the end of the stem 17 and has an end flange 51 with an aperture 52 therethrough freely receiving a tongue 53 on the end of a threaded locking finger 54 of the locking device 15. A cotter pin or the like retainer 55 on the end of the tongue 63 holds the finger 54 in freely swingable and axially shiftable relation to the bracket 44. The end of the finger 54 is bent at 56 to seat in a selected socket 33.

A sleeve 57 is threaded on the finger 54 and has a knurled head 58 for easy rotation of the sleeve. The sleeve 57 abuts against the end flange 51 of the bracket 54 and when the sleeve is tightened, the end of the finger 56 in the selected socket hole 33 will exert an axially expanding force on the stems 17 and 19 to wedge the feet 20 of the heads 16 and 18 tightly against the door opening walls 22.

Therefore to lock the gate 10 in the door opening 23 it is only necessary to extend the panels and frame until the feet 20 engage the walls 22 and to then seat the finger end 56 in the closet adjacent socket hole 33 with the sleeve bottomed on the end flange 51 of the bracket 44. Then the head 58 is manually rotated to force the sleeve 57 tightly against the bracket wall 51 thereby elongating the finger assembly relative to the bracket 44 and forcing the feet 20 against the walls 22.

Figure 7:
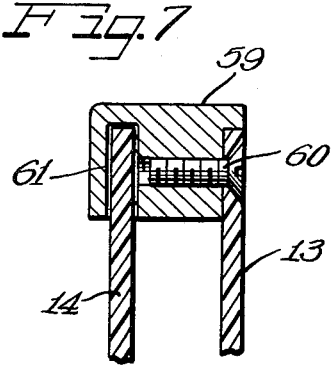
FIGURE 7 is an enlarged cross sectional view taken along the lines VII—VII of FIG. 1.

To further rigidify and guide the panels 13 and 14 nylon guide blocks 59 shown in FIG. 7 are provided on the top and bottom edges of panel 13. Fasteners 60 connect the blocks to the panel 13 and each block has a groove 61 slidably receiving the panel 14. The blocks 59 are mounted adjacent the inner edge of the panel 13 on both the top and bottom thereof. They form a slidable reinforcement holding the panels in spaced adjacent relation and thus cooperate with the stems 17 and 19 and the nylon buttons 42 and 49.

From the above description it will therefore be understood that the invention provides a lightweight inexpensive solid panel adjustable gate adapted to be easily locked in position in a door opening or the like without requiring fasteners and without marring the woodwork. The gates of this invention are locked in position from the face thereof that is not exposed to the child or pet to be confined and since they provide solid panel walls to the confined side they are safe and free from pivots or the like which might injure the confined child or pet.

I claim as my invention:

1. In an adjustable gate assembly for a doorway or the like opening having two elongated overlapped parallel slidably connected panels, the improvement of, a plurality of sockets spaced along the length of one panel, and a locking device carried by the other panel to cooperate with said sockets in wedge-locking the gate assembly in doorways of various widths, said locking device comprising a bracket mounted on said other panel and having a rigid flange formed thereon providing an abutment surface extending substantially transversely to said panels, means defining an aperture in said flange, a cylindrical finger having a threaded central portion, a tongue having a reduced transverse dimension formed at one end of the finger and extending through said aperture, and a bent portion at the other end of the finger for inserting into a selected socket, fastener means on said tongue situated a first given distance from said central portion to enable said finger to be moved axially on said flange said first given distance so that regardless of the width of the doorway the gate assembly can be widened to doorway width and the bent portion of the finger can be inserted into one of said sockets, and a complementary threaded sleeve mounted on said central portion and movable into snug engagement with said abutment surface to expand and to tightly lock said gate assembly in the doorway.

2. The gate assembly as defined in claim 1 and wherein said bent portion extends transversely to said panels a second given distance such that when it is inserted in a socket the remaining portions of said finger extend inwardly at a slight angle with respect to said panels to overcome any tendency of the panels to separate from each other in a transverse direction upon tightening of said locking device.

3. In an adjustable gate assembly for a doorway or the like opening having two elongated overlapped parallel slidably connected and expansible panels, the improvement of a plurality of sockets spaced along the length of one panel, and a locking device carried by the other panel to cooperate with said sockets in wedge-locking the gate assembly in doorways of various widths, said locking device comprising an apertured flange rigidly mounted on said other panel extending substantially transversely to said panels, a cylindrical finger having a sleeve receiving threaded portion, a tongue having a reduced transverse dimension formed at one end of the finger and extending through said aperture, a socket seating member at the other end of the finger for insertion into a selected socket, fastener means on said tongue situated a given distance from said threaded portion to enable said finger to be moved axially on said flange said given distance so that regardless of the width of the doorway the gate assembly can be expanded to doorway width and the socket seating member can be inserted into one of said sockets, said flange and said socket seating member providing, together, a pair of relatively movable panel expanding surfaces, and a complementary threaded sleeve mounted on said sleeve receiving threaded portion and movable into snug engagement with one of said panel expanding surfaces to expand the panels and to tightly lock said gate assembly in the doorway.

References Cited by the Examiner

UNITED STATES PATENTS

| 1,196,444 | 8/16 | Ellis | 160—225 |
| 1,481,615 | 1/24 | Meyer | 20—71 |
| 1,853,531 | 4/32 | Abrams et al. | 160—225 |
| 2,577,034 | 12/51 | Quinlan | 160—217 |
| 2,768,850 | 10/56 | Minnis | 292—63 |
| 2,859,811 | 11/58 | Rusch | 160—136 |
| 3,000,063 | 9/61 | Hoog | 160—215 |

FOREIGN PATENTS 201,577  3/56  Australia.

HARRISON R. MOSELEY, *Primary Examiner.*